Mar. 5, 1929.　　D. M. SOLENBERGER　　1,703,904

PISTON RING

Filed Dec. 31, 1925

Inventor
Dean M. Solenberger
By Whittemore, Hulbert, Whittemore and Belknap
Attorneys Patented Mar. 5, 1929.

1,703,904

UNITED STATES PATENT OFFICE.

DEAN M. SOLENBERGER, OF CLEVELAND, OHIO, ASSIGNOR TO SIMPLEX PISTON RING COMPANY, OF CLEVELAND, OHIO, A CORPORATION OF OHIO.

PISTON RING.

Application filed December 31, 1925. Serial No. 78,676.

The invention relates to sealing rings of that type having both radial and axial flexibility and consists in the novel construction as hereinafter set forth.

My improved ring A which is formed of cast iron or other suitable material is first machined or ground to predetermined axial and radial dimensions. This ring is then sawed or otherwise slotted to form a series of obliquely extending overlapping slots B, B' leaving obliquely extending resilient bars C, C' therebetween. These are so proportioned as to permit of axial compression of the ring to a predetermined extent and so that it will fit the ring groove for which it is designed, thereby developing a predetermined pressure against the side walls of said groove.

At one point in its circumference the ring is severed along an oblique line intermediate a pair of the slots B, B² as indicated at D. As this severing lessens the axial pressure on the adjacent portions of the ring, I have compensated for this making the end bars C² of slightly greater width than the bars C, C' so as to impart an additional element if rigidity.

Figure 1:
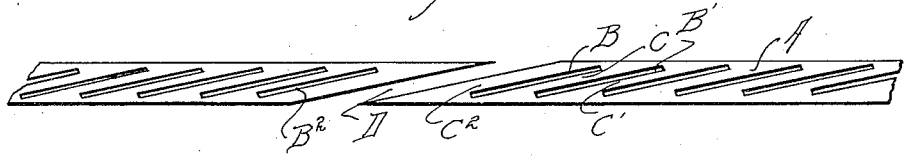
Figure 1 is a diagram showing the side elevation of a ring as developed in a plane.
Figure 2:
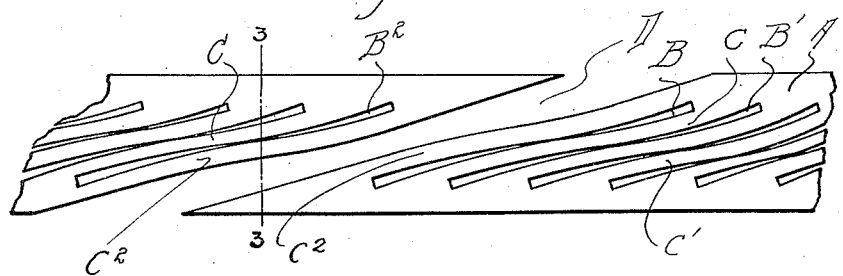
Figure 2 is an enlarged elevation of a portion of the ring under axial compression to engage the ring groove.
Figure 3:
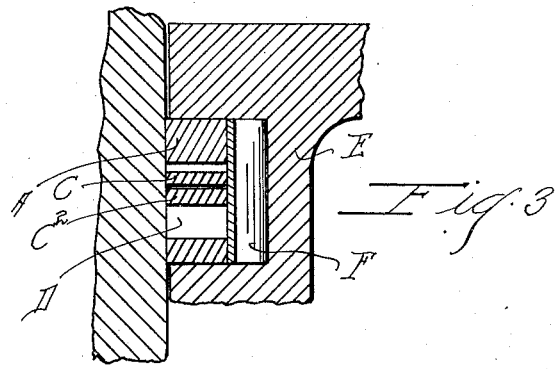
Figure 3 is a cross section on the line 3—3 of Figure 2.

The ring constructed as described and properly proportioned will maintain close sealing contact with the side walls of the groove and the piston or other member indicated at E, Figure 3. The axial pressure is, however, sufficiently limited to permit freedom for radial movement of the ring within the groove without an excessive radial pressure thereon. This radial pressure may be developed by any suitable means such as the ribbon expander at F arranged between the bottom of the groove and the ring.

What I claim as my invention is:

1. A sealing ring provided with a series of obliquely inclined circumferentially extending slots closed at their opposite ends and overlapping to form therebetween a series of resiliently flexible bars, said ring being obliquely trans-split intermediate a pair of said slots.

2. A sealing ring provided with a series of obliquely inclined circumferentially extending slots closed at their opposite ends and overlapping to form therebetween a series of resiliently flexible bars, said ring being trans-split substantially parallel to and between a pair of said slots.

3. A sealing ring provided with a series of obliquely inclined circumferentially extending slots overlapping to form therebetween a series of resiliently flexible bars, said ring being trans-split substantially parallel to and between a pair of said slots and the resilient bars upon opposite sides of the split being slightly increased in cross section to compensate for the weakening of the split.

In testimony whereof I affix my signature.

DEAN M. SOLENBERGER.